(12) United States Patent
Shenfield et al.

(10) Patent No.: US 7,350,215 B2
(45) Date of Patent: Mar. 25, 2008

(54) SYSTEM AND METHOD FOR DYNAMIC CONTENT PROCESSING WITH EXTENDABLE PROVISIONING

(75) Inventors: Michael Shenfield, Richmond Hill (CA); Viera Bibr, Kilbride (CA); Bryan R. Goring, Milton (CA)

(73) Assignee: Research In Motion Limited, Waterloo (CA)

( * ) Notice: Subject to any disclaimer, the term of this patent is extended or adjusted under 35 U.S.C. 154(b) by 548 days.

(21) Appl. No.: 10/787,950

(22) Filed: Feb. 27, 2004

(65) Prior Publication Data

US 2005/0060686 A1    Mar. 17, 2005

Related U.S. Application Data (60) Provisional application No. 60/503,980, filed on Sep. 17, 2003.

(51) Int. Cl.
| | |
|---|---|
| G06F 3/00 | (2006.01) |
| G06F 3/01 | (2006.01) |
| G06F 9/46 | (2006.01) |
| G06F 3/03 | (2006.01) |

(52) U.S. Cl. .................... 719/319; 719/328; 715/748
(58) Field of Classification Search ............... 719/319, 719/328; 715/745, 748
See application file for complete search history.

(56) References Cited

U.S. PATENT DOCUMENTS

| | | | | |
|---|---|---|---|---|
| 6,460,041 | B2 * | 10/2002 | Lloyd ........................... | 707/10 |
| 6,546,554 | B1 | 4/2003 | Schmidt et al. | |
| 6,857,074 | B2 * | 2/2005 | Bobo, II ...................... | 713/168 |
| 6,859,909 | B1 * | 2/2005 | Lerner et al. ............... | 715/512 |
| 7,103,773 | B2 * | 9/2006 | Erickson et al. ............ | 713/170 |

(Continued)

FOREIGN PATENT DOCUMENTS

EP    0 718 761 A    6/1996

(Continued)

OTHER PUBLICATIONS

International Preliminary Report on Patentability for PCT International Application No. PCT/CA2004/000198, Mar. 30, 2006, 5 pages, International Preliminary Examining Authority.

(Continued)

*Primary Examiner*—William Thomson
*Assistant Examiner*—Richard Pantoliano, Jr.
(74) *Attorney, Agent, or Firm*—Gowling Lafleur Henderson LLP (57) ABSTRACT

Data can be stored in a wide variety of formats, and it is recognized that not all terminals have the resources for storing the appropriate Application Program for processing and/or viewing the data as defined in a particular format. Systems and methods are described for dynamically processing a generic content expressed in a structured definition language. The systems and methods use an associated content handler having a set of instructions suitable for processing the content, such as XML content. The method comprises receiving a content envelope including the content and a reference to the associated content handler. The associated content handler is requested using the reference, the reference including a reference location for the content handler. Once obtained, the content is processed using the set of instructions of the content handler. The instructions can be expressed in script and/or code.

20 Claims, 6 Drawing Sheets

U.S. PATENT DOCUMENTS

| | | | |
|---|---|---|---|
| 2002/0143949 A1* | 10/2002 | Rajarajan et al. | 709/226 |
| 2002/0184401 A1* | 12/2002 | Kadel et al. | 709/315 |
| 2003/0158902 A1* | 8/2003 | Volach | 709/206 |
| 2004/0002952 A1* | 1/2004 | Lee et al. | 707/1 |
| 2004/0111286 A1* | 6/2004 | Koenig et al. | 705/1 |
| 2005/0014494 A1* | 1/2005 | Owen et al. | 455/419 |

FOREIGN PATENT DOCUMENTS

| | | |
|---|---|---|
| WO | WO 00/52551 A | 9/2000 |
| WO | WO 00/52551 A2 * | 9/2000 |
| WO | WO 01/53937 A | 7/2001 |
| WO | WO 03/014920 A | 2/2003 |

OTHER PUBLICATIONS

Examination Report issued by the Chinese Patent Office dated Jun. 8, 2007, for corresponding Chinese Patent Application No. 200480026676.2.

* cited by examiner

SYSTEM AND METHOD FOR DYNAMIC CONTENT PROCESSING WITH EXTENDABLE PROVISIONING

This application claims the benefit of provisional application No. 60/503,980, filed Sep. 17, 2003, which is incorporated herein by this reference.

BACKGROUND

The present application relates to data content processing. There is a continually increasing number of terminals in use today, such as mobile telephones, PDAs with wireless communication capabilities, personal computers, self service kiosks and two-way pagers. Software applications which run on these terminals increase their utility. For example, a mobile phone may include an application which retrieves the weather for a range of cities, or a PDA may include an application that allows a user to shop for groceries. These software applications take advantage of the connectivity to a network in order to provide timely and useful services to users. However, due to the restricted resources of some terminals, and the complexity of delivering large amounts of data for processing to the terminals, developing and maintaining data processing capabilities of software applications remains a difficult and time-consuming task.

Extended Markup Languages, such as XML, have become a standard for presenting, formatting and exchanging generic data. Being implemented by virtually all platforms and environments, XML allows seamless integration of heterogeneous systems using common data interfaces. XML processing is supported by core programming languages, XML-based languages (e.g. XPATH, XQUERY) and script language extensions (e.g. ECMAScript for XML—E4X).

Data can be stored in a wide variety of formats, and it is recognized that not all terminals have the resources for storing the appropriate Application Program for processing and/or viewing the data as defined in a particular format. In some instances, the terminal will not recognize the format that the data is represented in, and therefore the user of the terminal may be required to select or obtain the appropriate Application Program. A further disadvantage of current data formats is that an older version of an Application Program may not recognize an updated data format, thereby resulting in the inability of the older application version to process or display the updated data.

Systems and methods of dynamic processing of data content are disclosed herein to obviate or mitigate the above presented disadvantages.

SUMMARY

Data can be stored in a wide variety of formats, and it is recognized that not all terminals have the resources for storing the appropriate Application Program for processing and/or viewing the data as defined in a particular format. In some instances, the terminal will not recognize the format that the data is represented in, and therefore the user of the terminal may be required to select or obtain the appropriate Application Program. A further disadvantage of current data formats is that an older version of an Application Program may not recognize an updated data format, thereby resulting in the inability of the older application version to process or display the updated data. Contrary to current data format processing schemes there is provided systems and methods for dynamically processing a generic content expressed in a structured definition language. The systems and methods use an associated content handler having a set of instructions suitable for processing the content. One such method comprises receiving a content envelope including the content and a reference to the associated content handler. The associated content handler is requested using the reference, the reference including a reference location for the content handler. Once obtained, the content is processed using the set of instructions of the content handler. The instructions can be expressed in script and/or code.

A method for dynamically processing a generic content expressed in a structured definition language using an associated content handler having a set of instructions suitable for processing the content is provided, the method comprising the steps of: receiving a content envelope including the content and a reference to the associated content handler; requesting the associated content handler using the reference, the reference including a reference location for the content handler; obtaining the content handler; and processing the content using the set of instructions of the content handler.

Also disclosed is a method for enabling the dynamic processing of a generic content expressed in a structured definition language using an associated content handler, the content handler having a set of instructions suitable for processing the content, the method comprising the steps of: preparing a content envelope to include the content; inserting a reference to the associated content handler in the content envelope, the reference including a reference location for the content handler; and making available the content handler for being accessed by the reference; wherein once obtained, the set of instructions is used to process the content.

A terminal for dynamically processing a generic content expressed in a structured definition language using an associated content handler having a set of instructions suitable for processing the content is further disclosed, the terminal comprising: a processing framework for receiving a content envelope including the content and a reference to the associated content handler; a requesting module operating in the framework for requesting the associated content handler using the reference, the reference configured to include a reference location for the content handler; a provisioning module operating in the framework for obtaining the content handler; and a processing module for processing the content using the set of instructions of the content handler.

A computer program product for dynamically processing a generic content expressed in a structured definition language using an associated content handler having a set of instructions suitable for processing the content is also provided, the computer program product comprising: a computer readable medium; a requesting module stored on the computer readable medium for operating in a runtime environment, the requesting module for requesting the associated content handler using the reference, the reference configured to include a reference location for the content handler; a provisioning module stored on the computer readable medium for operating in the runtime environment for obtaining the content handler; and a processing module coupled to the provisioning module for processing the content using the set of instructions of the content handler.

BRIEF DESCRIPTION OF THE DRAWINGS

These and other features will become more apparent in the following detailed description in which reference is made to the appended example drawings, wherein.

DESCRIPTION

Network System

Figure 1:
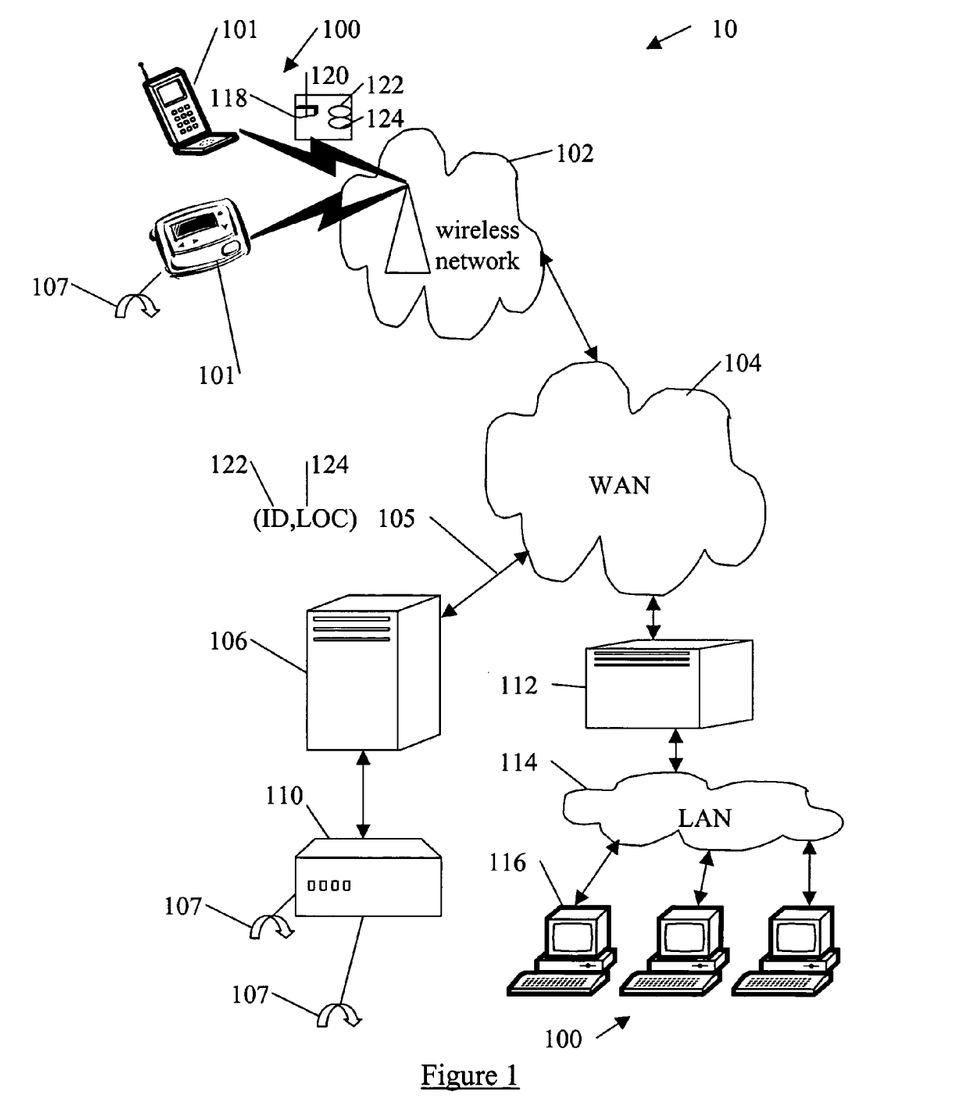
FIG. 1 is a block diagram of a network system.

Referring to FIG. 1, a network system 10 comprises a plurality of terminals 100 for interacting with one or more handler information servers 110 accessed by a handler server 106, via a coupled Wide Area Network (WAN) 104 such as but not limited to the Internet. These generic terminals 100 can be any suitable terminal such as but not limited to wired devices such as personal computers 116, wireless devices 101, PDAs, self-service kiosks and the like. The server 106 provides access to content handlers 107 through messages 105 including a reference name 122 (ID) of the requested handler 107. Information for the handler 107 can be obtained by the server 106 from an information server 110. The system 10 provides the capability of the terminal 100 to handle processing of an application content 120, such as but not limited to expressed in a structured definition language such as XML, that has the associated handler 107. The handler 107 could either be generic (content-dependent) or specialized (content and terminal 100-dependent). The application content 120 could be retrieved locally (terminal 100 storage) or from a remote server 106. Alternatively, the remote server 106 could push the content 120 on demand to the terminal 100. It is recognized that XML represents only one example of a structured definition language that can be used to define the content 120. Other example languages can include such as but not limited to HTML, XHTML, XSML, RDF, Machine Readable Cataloging (MARC), and Multipurpose Internet Mail Extensions (MIME). It is further recognized that the system 10 can be suitable to any range of XML-defined contents 120 to be used in conjunction with terminals 100 that may be limited in terms of connectivity, memory and/or storage.

The terminal 100 has a processing framework 206 (see FIG. 2) for processing a received XML envelope 118 (or other structured language) containing the embedded content 120, the content handler reference ID 122, and a handler reference location 124. It is noted that the envelope 118 contains this reference to the handler 107. The handler 107 can be resident locally or externally as dictated by circumstance. Further, the system 10 can also have a gateway server 112 for connecting the desktop terminals 116 via a Local Area Network (LAN) 114 to the server 106. Further, the system 10 can have a wireless network 102 for connecting the wireless devices 101 to the WAN 104. It is recognized that other terminals and computers (not shown) could be connected to the server 106 via the WAN 104 and associated networks other than as shown in FIG. 1. The generic terminals 100, wireless devices 101 and personal computers 116 are hereafter referred to as the terminal 100 for the sake of simplicity. Further, the networks 102, 104, 112 of the system 10 will hereafter be referred to as the network 104, for the sake of simplicity. It is recognized that there could be multiple servers 106, 110, and/or that the functionality of the servers 106 and 110 could be combined, if desired.

Generic Terminal

Figure 2:
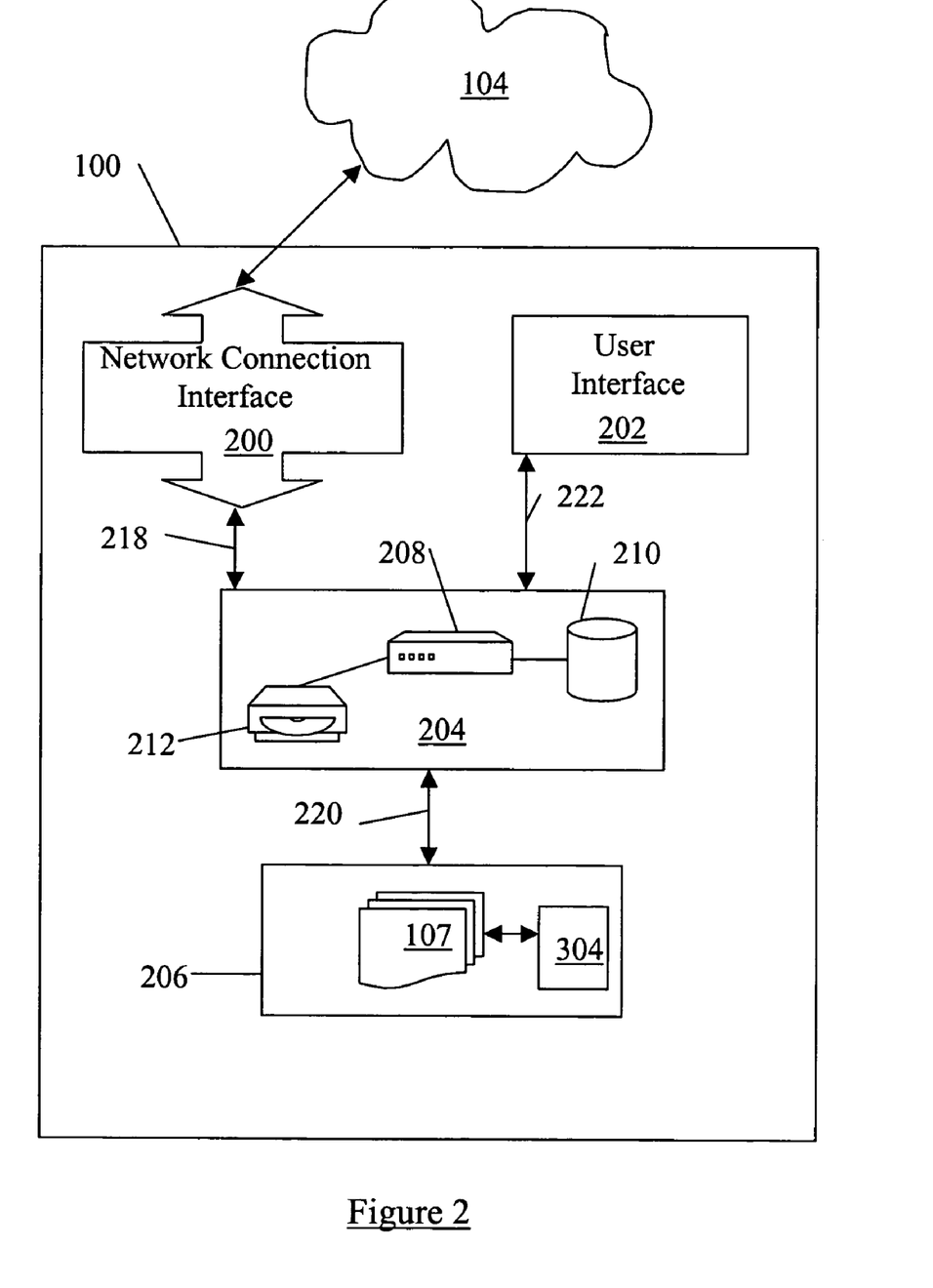
FIG. 2 is a block diagram of a generic terminal of FIG. 1.

Referring to FIG. 2, the terminals 100 can be any suitable data processing platform such as but not limited to desktop or laptop computer systems, mobile telephones (or other wireless devices), PDAs, two-way pagers and/or dual-mode communication terminals. The terminals 100 include a network connection interface 200, such as a wireless transceiver or a wired network interface card or a modem, coupled via connection 218 to a terminal infrastructure 204. The connection interface 200 is connectable during operation of the terminals 100 to the network 104, such as to the wireless network 102 by, for example, RF links (see FIG. 1), which enables the terminals 100 to communicate with each other and with external systems (such as the server 106—see FIG. 1) via the network 104 and to coordinate the requests/response messages 105 between the terminals 100 and the servers 106, 110. The network 104, in some implementations, can support the transmission of the handlers 107 in the requests/response messages 105 between terminals 100 and external systems, which are connected to the network 104. The network 104 may also support voice communication for telephone calls between the terminals 100 and terminals which are external to the network 104. A wireless data transmission protocol can be used by the wireless network 102, such as but not limited to DataTAC, GPRS or CDMA.

Referring again to FIG. 2, the terminals 100 also have a user interface 202, coupled to the terminal infrastructure 204 by connection 222, to facilitate interaction with a user (not shown). The user interface 202 can include one or more user input devices such as but not limited to a QWERTY keyboard, a keypad, a trackwheel, a stylus, a mouse, a microphone and the user output device such as an LCD screen display and/or a speaker. If the screen is touch sensitive, then the display can also be used as the user input device as controlled by the terminal infrastructure 204. The user interface 202 is employed by the user of the terminal 100 to coordinate the requests/response message messages 105 over the system 10 (see FIG. 1) as employed by the processing framework 206.

Referring again to FIG. 2, operation of the terminal 100 is enabled by the terminal infrastructure 204. The terminal infrastructure 204 includes the computer processor 208 and the associated memory module 210. The computer processor 208 manipulates the operation of the network interface 200, the user interface 202 and the framework 206 of the communication terminal 100 by executing related instructions, which are provided by an operating system; the computer processor 208 can include one or more processing elements that may include one or more general purpose processors and/or special purpose processors (e.g., ASICs, FPGAs, DSPs, etc). Further, it is recognized that the terminal infrastructure 204 can include a computer readable storage medium 212 coupled to the processor 208 for providing instructions to the processor for loading/updating client application programs 107. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid state memory card, or RAM provided in the memory module 210. It should be noted that the above listed example computer readable mediums 212 can be used either alone or in combination.

Processing Framework

Figure 3:
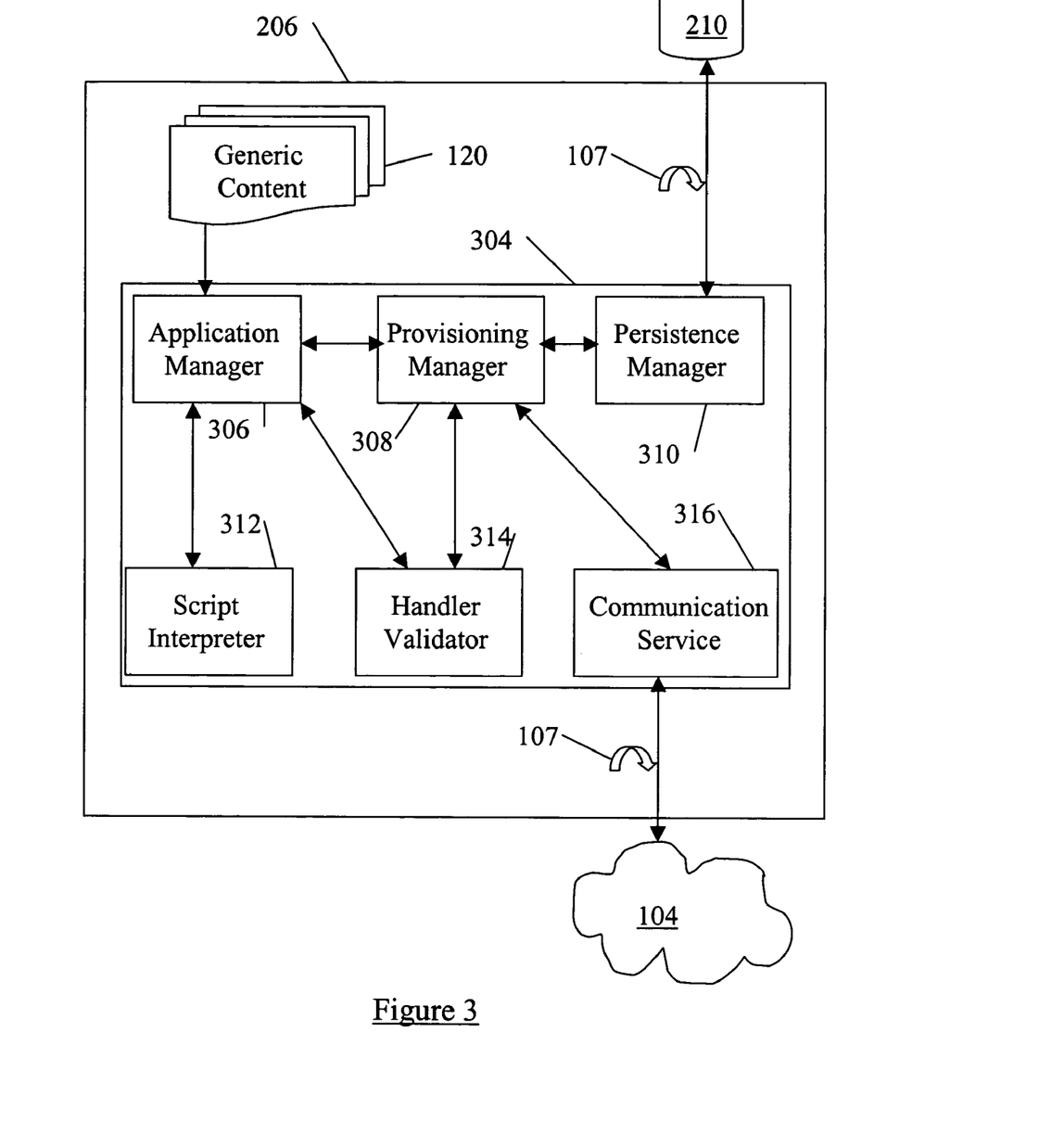
FIG. 3 shows a processing framework of the device of FIG. 2.

Referring to FIGS. 2 and 3, a client runtime environment is provided by the processing framework 206. The framework 206 of the terminal 100 is coupled to the infrastructure 204 by the connection 220 and is an interface to the terminal 100 functionality of the processor 208 and associated operating system of the infrastructure 204. The client runtime environment of the terminals 100 is preferably capable of generating, hosting and executing client application programs (not shown) on the terminal 100. Further, specific functions of the client runtime environment can include a variety of functionality such as but not limited to service framework 304 support for language, coordinating memory allocation, networking, management of data during I/O operations, coordinating graphics on an output device of the terminals 100 and providing access to core object oriented classes and supporting files/libraries. Examples of the runtime environments implemented by the terminals 100 can include such as but not limited to Common Language Runtime (CLR) by Microsoft and Java Runtime Environment (JRE) by Sun Microsystems.

The processing framework 206 provides ability to dynamically manage the Content Handlers 107. Specific actions of the framework 206 can include handler management functions such as but not limited to: determining the handler 107 required for the Content 120; lookup of the handler 107 on the terminal 100 or via the network 104; downloading the handler 107 from the specified reference location 124 if needed; and removing or otherwise suspending/caching handlers 107 no longer required by the terminal 100.

The processing framework 206 manages the content handler 107 provisioning, retrieving and removing from the runtime environment of the terminal 100. The framework 206 also supports the handler 107 execution. The application program requests the Processing Framework 206 to handle or otherwise process the generic Content 120 using the associated handler 107. The framework 206 is capable of retrieving the handler 107 based on its reference location 124 specified in the Content envelope 118 or schema. If the handler 107 is not available on the terminal 100, the framework 206 is capable of downloading the handler 107 from the reference location 124 specified in the envelope 118. The application program could also notify the framework 206 when the Content 120 processing is completed and the associated handler 107 is no longer required for its operations. The framework 206 could then reclaim the space in active memory 210 of the terminal infrastructure 204 occupied by the no longer useful Content Handler 107 (such as in the case of an application program upgrade). In the environments with centralized management of the terminals 100 is being enforced (e.g. corporate space), a central server (not shown) could initiate removal of obsolete handler 107 on the terminals 100.

Referring again to FIG. 3, the Processing Framework 206 can provide generic service framework 304 functionality as part of, or separate from, the application program 107 and can include, without limitation, an Application Manager 306, a Handler Validator 314, a Provisioning Manager 308, a Communication Service 316, a Script Interpreter 312, and a Persistence Manager. Other services (not shown) can include a presentation service, an access service and a utility service. It is recognised that separate service functionality can be shared by a plurality of application programs and handlers 107.

Referring again to FIG. 3, the communication service 316 manages connectivity between the terminals 100 and the servers 106, 110 via the network 104, including the ability to fetch remotely stored content handlers 107 as required. The persistence manager 310 allows the content handlers 107 to be locally stored in the memory module 210. The provisioning manager 308 manages the provisioning of the content handlers 107 on the terminal 100. Content handler 107 provisioning can include storing, retrieving, downloading and removing handlers 107 on the terminal 100, such as requesting and receiving remotely stored handlers 107 from the server 106, 110 and locally stored handlers 107 from the storage 210. Further, the provisioning manager 308 can be responsible for providing APIs (application program interfaces) to the applications for enabling dynamic requesting of the handlers 107 or remove same on request, as further described below. The Application Manager 306 can be used to interact with the user interface 202 (see FIG. 2), manages application lifetime, etc. The Application Manager 306 can also provide interfaces that the applications can use to request services, such as loading the Content Handler 107 for the Content 120. The Handler Validator 314 can be used for security reasons—to control the validity of the content 120 downloaded to the terminal and protect the user from rogue scripts (such as but not limited to viruses). The Script Interpreter 312 can be used to run the content handler 107 script/code. API to provision for manipulation of content handlers 107 can be available through the Script Interpreter 312. The Script Interpreter 312 broadly is designed to execute a set of instructions. Such instructions can be encoded in any specified programming and/or scripting language; further, instructions could be in a compiled or partially compiled form (e.g., Java bytecode). It is recognized that other configurations of the processing framework 206 with respective services 306, 308, 310, 312, 314, 316 for implementing the application 107 adaptation can be other than shown, as desired. Further, it is recognized that the framework 206 can be part of the operating system of the terminal infrastructure 204.

Content Envelope

Figure 4:
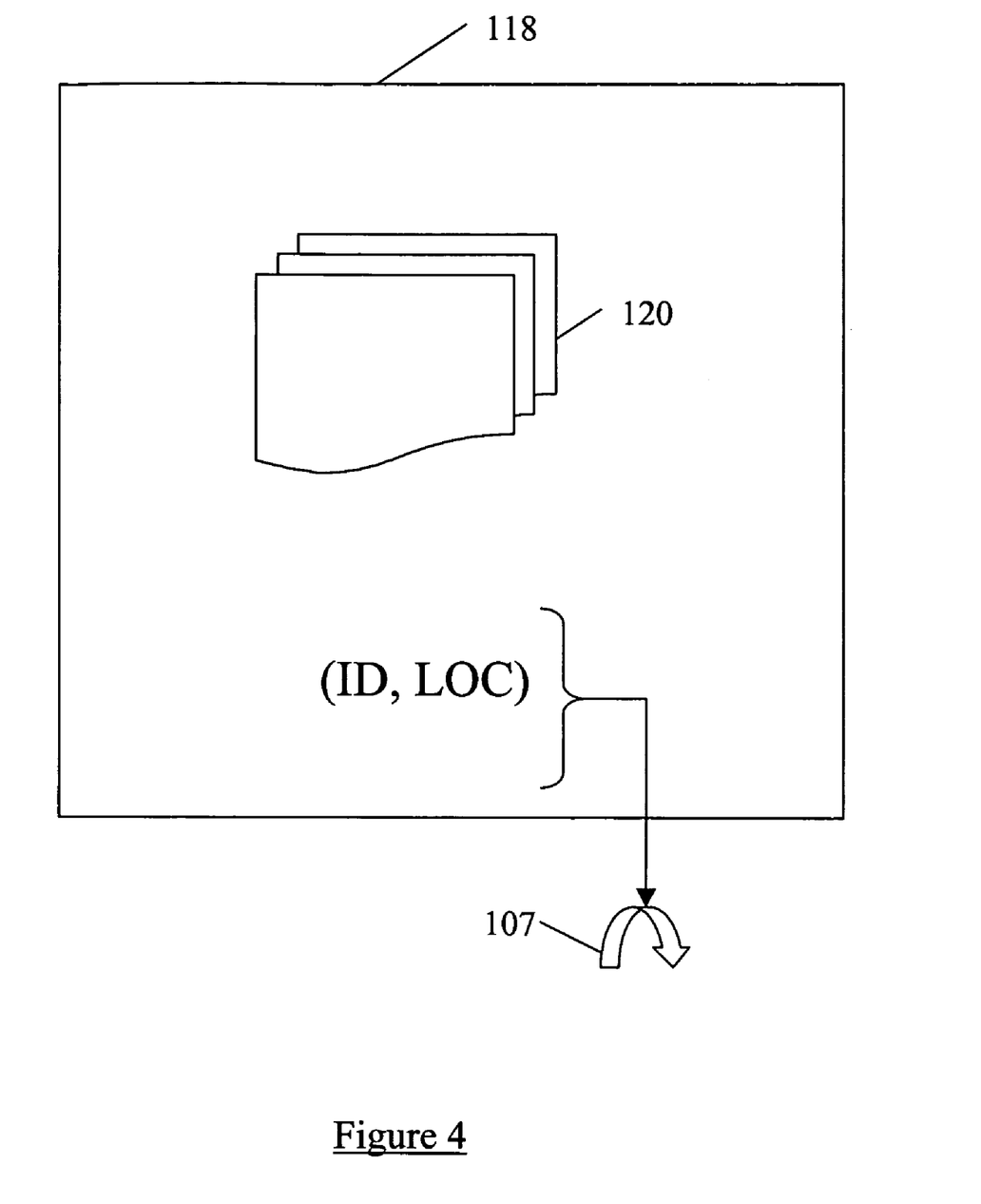
FIG. 4 is a content envelope of FIG. 1.

Referring to FIG. 4, the envelope 118 contains the content 120, the reference name 122 of the associated content handler 107, and the reference location 124 for obtaining the content handler 107 locally or remotely. The Content 120 could represent a variety of forms of data such as but not limited to browser screens (e.g. xHTML), application data (e.g. game levels), wireless messages (email/SMS/MMS), or stand-alone applications. The Content 120 wrapped in the envelope 118 contains either the direct or the indirect (e.g. such as through XML schema) reference to one or more appropriate Content Handlers 107. Example data formats of the data are jPEG, GIF, HTML, WAV files, Flash media, etc; although other types of formatted data would be feasible. The Content Reference contains references to type and location of the Content Handler 107. Optionally, Content 120 could use an XML Schema definition to identify a URI and type for the associated Content Handler 107.

In further terms, the Content Handler 107 is coupled to the content envelope 118 via the reference location 124 and the corresponding reference name 122. The handler 107 represents a set of instructions (i.e. code and/or script) to handle or otherwise process the Content 120. The instruction set can be implemented in a platform-neutral script (such as but not limited to ECMAScript, E4X, etc.) or as environment-specific code components for implementation in the native runtime environment of the processing framework 206 (such as but not limited to C, C+, etc.). The content handler 107 also can be considered as an appropriate Application Program for processing and/or viewing the data defined in a particular format, as represented by the content 120, for example, specified in a structured definition language such as XML. These content handlers 107 can be resident on the terminals 100 or accessible via the network 104.

Example Content Handlers

The content handlers 107 can be accessed via different dynamic lookup modes. The handler 107 could be either generic or terminal 100 specific. The Processing Framework 206 is capable of retrieving the content handler reference name 122 and location 124 and provisioning the required handler 107 from the specified location 124. The required Handler 107 for the Content 120 and its location can be indicated in different ways: directly within the Content; or indirectly using a document schema reference. Accordingly, these modes for obtaining the handlers 107 can include such as but not limited to direct reference, and indirect reference, as further described below.

The data of the envelope 118 can contain pointers/tags (i.e. the handler reference name 122 ID) to the applications/code/script used to manage or otherwise process the data. For example, a user receives video file on the terminal 100 but does not have the required player (i.e. the content handler 107). Therefore, the video file (envelope 118) would contain XML data (content 120) with the references 122,124 to the required player.

In the case of the direct reference, the following example XML document shows the location 124 and name 122 in bold. For example, the XML document has a predefined child element handler that specifies type, version, and location of the Content Handler 107 associated with this document.

---

XML Document
<?xml version="1.0"?>
<eventUpdatexmlns:xsi="http://www.w3.org/2001/XMLSchema-instance"
xsi:noNamespaceSchemaLocation="example0.xml">
   <event>
     <title>Dog Sledding Races</title>
     <location>Banff, Alberta</location>
     <date>2004-01-21</date>
     <details>DEC12</details>
   </event>
   <handler>
     <type>E4X</type>
     <URI>http://www.dograces.com/handlers/NewEvent.es</URI>
     <version>1.3</version>
   </handler>
</eventUpdate>

---

In the case of the indirect reference, the following example XML document shows the Content Handler Location 124 defined in a XSD file in bold. For example, the XML document specifies the Content Handler using document schema reference. This approach can eliminate the Content Handler reference name 122 inside the XML document but requires an extra step downloading the additional schema file.

---

XML Schema
<xsd:schema xmlns:xsd='http://www.w3.org/2000/XMLSchema'
   xmlns:handler=
    'http://www.dograces.com/schema/handlers/v10'>
   <xsd:element name="eventUpdate" type="EventNotification"/>
   <xsd:complexType name="EventNotification">
     <xsd:sequence>

-continued

<xsd:element name="event" type="Event"
       minOccurs="1" maxOccurs="5"/>
     </xsd:sequence>
   </xsd:complexType>
   <xsd:complexType name="Event">
     <xsd:sequence>
       <xsd:element name="title" type="xsd:string"/>
       <xsd:element name="location" type="xsd:string"/>
       <xsd:element name="date" type="xsd:date"/>
       <xsd:element name="details" type="xsd:string"/>
     </xsd:sequence>
   </xsd:complexType>
</xsd:schema>
XML Document
<?xml version="1.0"?>
<eventUpdatexmlns:xsi="http://www.w3.org/2001/XMLSchema-instance"
xsi:noNamespaceSchemaLocation="example1.xml">
   <event>
     <title>Dog Sledding Races</title>
     <location>Banff, Alberta</location>
     <date>2004-01-21</date>
     <details>DEC12</details>
   </event>
</eventUpdate>

---

It is recognized that structured definition language documents and schema files can be used other than described above, if desired.

Processing of Generic Content

The system 10 describes capability to dynamically retrieve the associated Content Handler 107 required to process the Content 120 (such as XML) once it has been presented for processing on the terminal 100. The Content Handler reference associated with the content 120 is embedded in the message data envelope 118, or otherwise associated with a particular group of data of the contained message. This approach can support dynamic modularity, mutation and extensibility. It is further recognized that a variety of structured definition languages can be used, such as XML, HTML and XGML, etc. Provisioning of the Content Handler 107 on the terminal 100 can be handled dynamically, on a per need basis as the data of the content 120 is processed by the framework 206. In a wireless environment characterized by small storage space and limited processor power, the ability to provision on demand and remove no longer required handlers can be beneficial.

For example, upon execution of the application program on the terminal 100, the program requests the Processing Framework 206 to handle new Content 120. The program could have obtained this content 120 as follows, such as but not limited to: downloaded from the server 106 according to user request or application logic; pushed to the terminal 100 by the application server 110 (e.g. channel update, event notification); or loaded from the local application store (when retrieving loosely coupled content 120—e.g. user reached a new game level).

Figure 5:
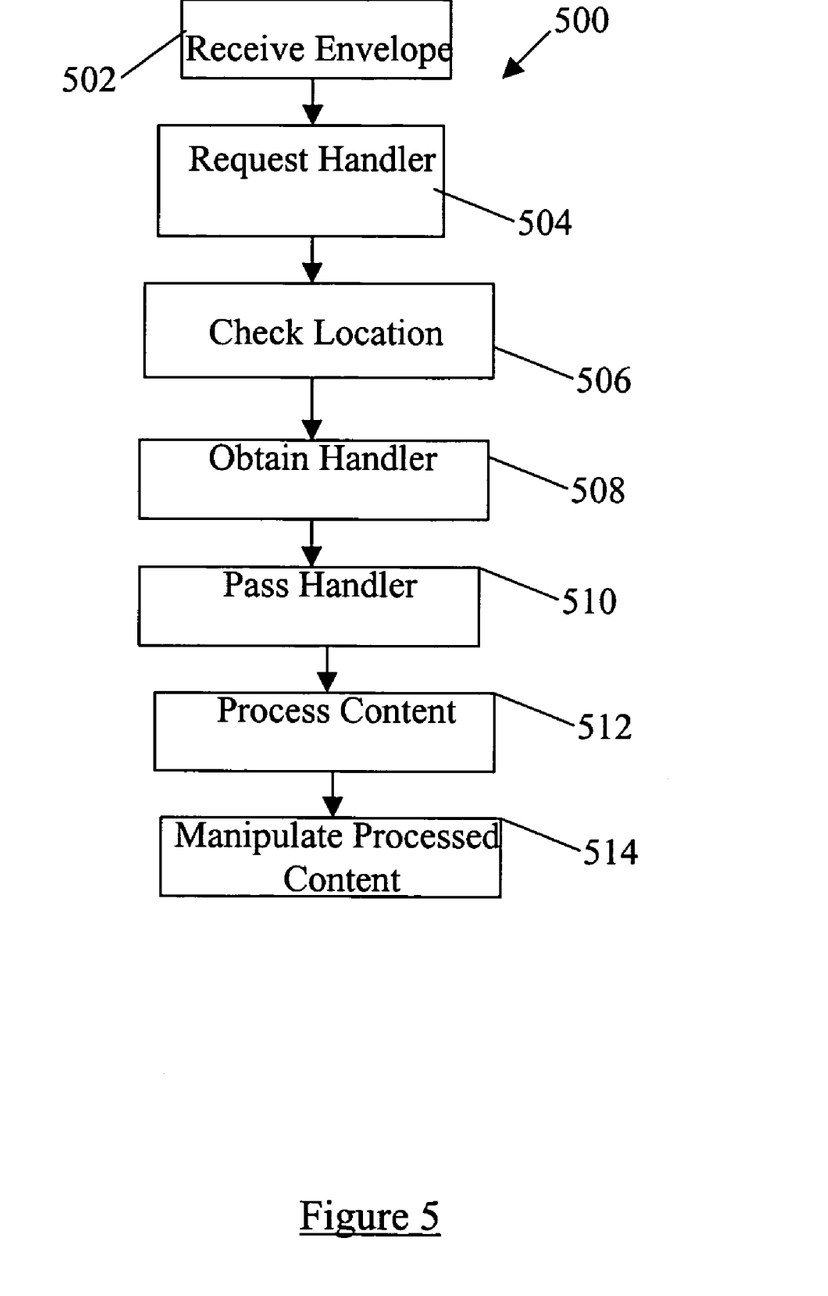
FIG. 5 is an example operation of the system of FIG. 1.
Figure 6:
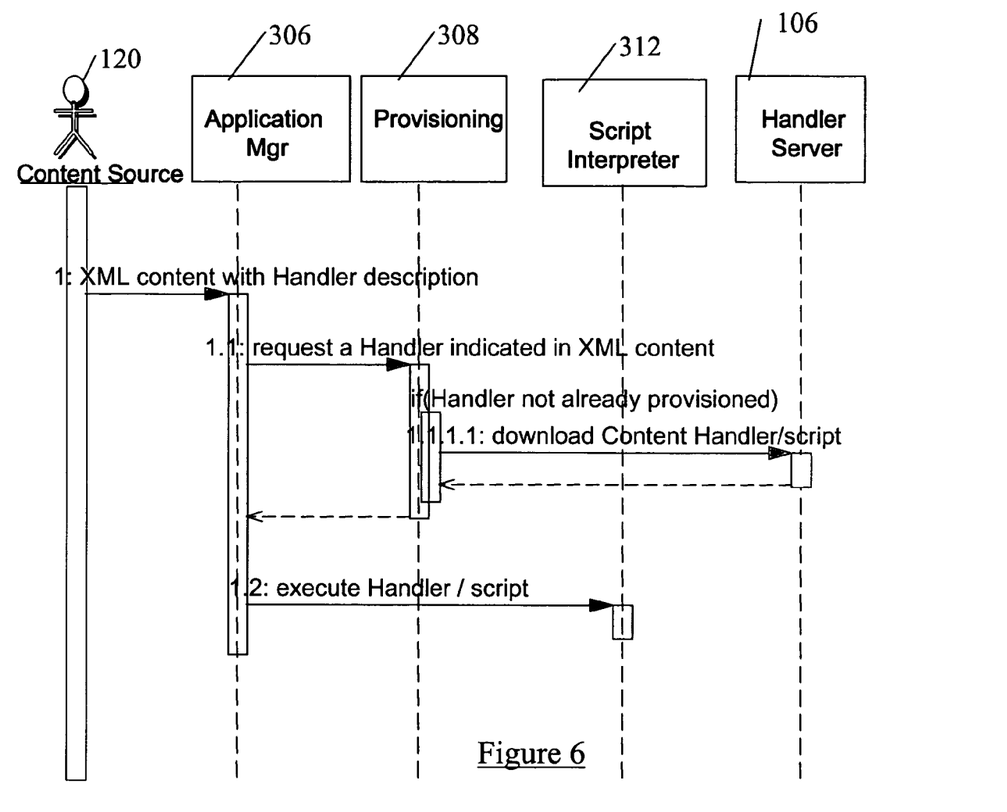
FIG. 6 is a workflow for processing of generic content of FIG. 5.

Referring to FIGS. 4, 5 and 6, operation 500 of the system 10 begins with the envelope 118 being received 502 by the terminal 100. The content 120 with handler reference is passed to the processing framework 206 of the terminal 100, including such as the application manager 306 (see FIG. 3). The application manager 306 requests 504 the specific content handler 107 indicated in the content 120 from the provisioning manager 308. The provisioning manager 308 checks 506 if the specified handler 107 is resident on the terminal 100. If so, the specified handler 107 is passed back to the application manager 306. Otherwise, the provisioning manager 308 requests and proceeds to download or otherwise obtain 508 the specified content handler 107 from the handler server 106 via the network 104 (see FIG. 1). It is recognized that the handler server 106 can be a dedicated handler repository/database, and/or can have access to same. Once downloaded, the provisioning manager 308 passes 510 the content handler 107 back to the application manager 306. The application manager 306 then proceeds to process 512 the content 120 using the handler interpreter 312 for running the handler 107 set of instructions (i.e. script and/or code). Executing the handler interpreter 312 provides for the processed data to be displayed and/or otherwise manipulated 514 by the user interface 202 and/or the terminal infrastructure 204 (see FIG. 3) of the terminal 100.

The above description relates to one or more exemplary systems and methods. Many variations will be apparent to those knowledgeable in the field, and such variations are within the scope of the application. It is recognized that structured definition languages other than XML can be used, as well as a plurality of different terminals, such as PC's, PDA's, kiosks, mobile devices. The terminals 100 can be deployed on wired and/or wireless network topologies. For example, it is recognised that implementation of the content handlers can be performed by a requesting module operating in the framework for requesting the associated content handler using the reference, a provisioning module operating in the framework for obtaining the content handler; and a processing module for processing the content using the set of instructions of the content handler. These modules can be made available on the terminal 100 as software, hardware, or a combination thereof.

As described above, the system 10 and method 500 are applicable to a wide range of generic terminals 100, and corresponding applications (including a browser), dealing with processing of content 120, by example. Operational efficiencies could be achieved when the method 500 is applied to mobile terminals 101, due to apparent limitations of these terminals 100 such as occasional connectivity, limited memory and storage, limited screen real estate, and/or high latency. Use of the system 10 can provide the ability of the terminal 100 to handle generic content 120. For example, when discovering that a new type of XML data in the envelope 118 has been received from the server 106, the application provisioned on the terminal 100 can download the appropriate handler 107 to process this data. For a browser, the ability to load miscellaneous XML processing plugins on demand (e.g. miscellaneous types of XML, schema validation, execution) can be advantageous.

The system 10 can also provide for the decoupling of presentation/data and logic by allowing development of content 120 processing functions (handlers 107) targeted for a specific client environment (e.g. wireless device 101) to be downloaded on demand after the content 120 has been loaded on the runtime environment of the device 101. The system 10 can also provide for dynamic extension of existing application programs by allowing application developers to program hookup "stubs" (empty handlers 107) to plug-in future application extensions. When additional functionality is developed external to the application, the hookup could be replaced with a "redirector" script that enables application extensions. The system 10 can also provide for dynamic versioning/content updates, wherein seamless application updates can be handled (e.g. new virus definitions for anti-virus apps). The system 10 can also provide dynamic application provisioning and dynamic modification of application blocks, such that for XML defined applications this mechanism could allow dynamic application provisioning and dynamic modification of application blocks based on the user action or new data/options available becoming available. The system 10 can also provide for efficient storage management for limited terminals 100, wherein the ability to provision when needed and clear space by removing application data/blocks dynamically can provide significant advantages in a limited environment. The system 10 can also provide dynamic execution of server-initiated push operations. It is recognized that the network environment of the data content manager provisioning can be applied to both wired and wireless topologies.

The embodiments of the invention in which an exclusive property or privilege is claimed are defined as the follows:

1. A method for dynamically processing generic content expressed in an extensible markup language (XML) on a wireless computing device, the wireless computing device configured to implement the steps of:
   receiving a content envelope including XML content and a reference to an associated content handler, the content handler comprising a set of instructions for processing the XML content;
   wherein the content handler is content and terminal type dependent;
   wherein the reference further includes a reference name;
   wherein the reference name of the content handler is included in the content;
   checking on a terminal for the location of the reference as either remote or local;
   referencing the content handler indirectly through a schema of the XML;
   requesting the content handler using the reference, the reference including a reference location for the content handler; and
   using the set of instructions of the content handler to process the XML content.

2. The method according to claim 1, wherein the set of instructions includes platform neutral script.

3. The method according to claim 1, wherein the set of instructions includes environment specific code.

4. The method according to claim 1, wherein the content handler is retrieved from a remote storage location.

5. The method according to claim 1, wherein the content handler is retrieved from a local storage location.

6. The method according to claim 5, wherein the content handler is pushed to the local storage location from a remote server.

7. The method according to claim 1 further comprising the step of implementing a service framework for providing service functionality to the interact with the content handler.

8. The method according to claim 7, wherein the service framework is shared between a plurality of the content handlers and their corresponding application programs.

9. The method according to claim 8, wherein the service framework includes services selected from the group consisting of: an application manager, a handler validator, a provisioning manager, a communications manager, a script interpreter, and a persistence manager.

10. The method according to claim 9 further comprising the step of the provisioning manager providing application program interfaces for enabling dynamic processing using the content handlers.

11. The method according to claim 8, wherein the service framework provides a at least one of a content handler look-up, content handler downloading, content handler deleting, or content handler suspending service.

12. The method according to claim 1 further comprising the step of initiating obtaining of the content handler selected by either a processing framework of the terminal or a network server.

13. A method for enabling the dynamic processing of generic content expressed in an extensible markup language (XML) using a computing device configured to implement the steps of:
preparing a content envelope including the XML content for transmission to a recipient;
inserting a reference to an associated content handler in the content envelope, the content handler comprising a set of instructions for processing the XML content and the reference including a reference location for the content handler;
wherein the content handler is content and terminal dependent;
wherein the reference further includes a reference name;
wherein the reference name of the content handler is included in the content;
checking on a terminal for the location of the reference as either remote or local;
referencing the content handler indirectly through a schema of the XML;
making the content handler available for access by the recipient; and
transmitting the content envelope to the recipient.

14. The method according to claim 13, wherein the set of instructions includes platform neutral script.

15. The method according to claim 13, wherein the set of instructions includes environment specific code.

16. The method according to claim 13, wherein the content handler is made available on a remote storage location.

17. The method according to claim 13, wherein the content handler is made available on a local storage location.

18. The method according to claim 17, wherein the content handler is pushed to the local storage location from a remote server.

19. A terminal for dynamically processing a generic content expressed in an extensible markup language (XML) using an associated content handler having a set of instructions suitable for processing the content, the terminal comprising a computer readable medium including instructions which, when executed by the terminal, provide the terminal with:
a processing framework for receiving a content envelope including the content and a reference to the associated content handler;
wherein the content handler is content and terminal dependent;
wherein the reference further includes a reference name;
wherein the reference name of the content handler is included in the content;
a requesting module operating in the framework for checking on a terminal for the location of the reference as either remote or local and requesting the associated content handler using the reference, the reference configured to include a reference location for the content handler;
a provisioning module operating in the framework for referencing the content handler indirectly through the XML schema and obtaining the content handler; and
a processing module for processing the content using the set of instructions of the content handler.

20. A computer program product for dynamically processing generic content expressed in an extensible markup language (XML), the computer program product comprising:
a computer readable medium having stored thereon:
a processing framework for receiving a content envelope including the XML content and a reference to an associated content handler, the content handler comprising a set of instructions for processing the XML content;
wherein the content handler is content and terminal dependent;
wherein the reference further includes a reference name;
wherein the reference name of the content handler is included in the content;
a requesting module for operating in a runtime environment, the requesting module for checking on a terminal for the location of the reference as either remote or local and for requesting the content handler using the reference, the reference configured to include a reference location for the content handler;
a provisioning module for referencing the content handler indirectly through the XML schema and operating in the runtime environment for obtaining the content handler; and
a processing module coupled to the provisioning module for processing the content using the set of instructions of the content handler.

* * * * *